(12) United States Patent
Pasolini et al.

(10) Patent No.: US 6,856,483 B2
(45) Date of Patent: Feb. 15, 2005

(54) DEVICE AND METHOD FOR GENERATING SYNCHRONOUS NUMERIC SIGNALS WITH PHASE-DELAY MINIMIZATION IN CONTROL SYSTEMS WITH OPEN-LOOP COMPENSATION

(75) Inventors: Fabio Pasolini, S. Martino Siccomario (IT); Lorenzo Barsacchi, Cecina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 277 days.

(21) Appl. No.: 10/194,431

(22) Filed: Jul. 11, 2002

(65) Prior Publication Data

US 2003/0039054 A1 Feb. 27, 2003

(30) Foreign Application Priority Data

Jul. 13, 2001 (IT) ..................... TO2001A0693

(51) Int. Cl.[7] .............................................. G11B 5/596
(52) U.S. Cl. .................................................. 360/77.02
(58) Field of Search ......................... 360/77.02, 77.01, 360/78.04; 369/44.26, 44.28; 341/111

(56) References Cited

U.S. PATENT DOCUMENTS 6,661,359 B2 * 12/2003 Hernden et al. ............ 341/111

* cited by examiner

Primary Examiner—Andrew L. Sniezek
Assistant Examiner—Mitchell Slavitt
(74) Attorney, Agent, or Firm—Lisa K. Jorgenson; Robert Iannucci; Seed IP Law Group PLLC

(57) ABSTRACT

A device for generating synchronous numeric signals, including a first signal generator which supplies a numeric reference signal having a first frequency and a first period; and a second signal generator which generates an internal numeric signal having a second frequency and a second period, and a synchronized numeric signal. In addition, the second signal generator includes a predictor which generates, with a third period and a third frequency higher than the first frequency and the second frequency, estimated samples correlated to a current sample and to a predetermined number of former samples of the internal numeric signal. The predictor, in turn, includes a selection circuit controlled by the first signal generator for selecting one among the estimated samples in each reference period, the synchronized numeric signal being formed by the selected estimated samples.

22 Claims, 6 Drawing Sheets

DEVICE AND METHOD FOR GENERATING SYNCHRONOUS NUMERIC SIGNALS WITH PHASE-DELAY MINIMIZATION IN CONTROL SYSTEMS WITH OPEN-LOOP COMPENSATION

BACKGROUND OF THE INVENTION

1. Field of the Invention

The present invention relates to a device and a method for generating synchronous numeric signals, with phase-delay minimization in control systems with open-loop compensation.

2. Description of the Related Art

As is known, the use of numeric-type control systems is increasingly widespread in various fields. As compared to traditional purely analog control systems, in fact, numeric control systems are extremely versatile and are, moreover, very often simpler to design, less subject to failure, and less costly. In practice, in numeric control systems, a microprocessor, or digital signal processor (DSP), receives, through an analog-to-digital converter, a measured signal correlated to a quantity to be controlled that is present in a system controlled and sampled at a preset control frequency. The measured signal is numerically processed to generate a control signal (having a frequency equal to the control frequency), which is supplied to an actuator for modifying the state of the controlled system and for keeping the quantity to be controlled close to a target value.

For numeric control systems to be efficient, it is, however, necessary to provide accurate analog-to-digital converters that convert with sufficient precision the signals supplied by the sensors and/or transducers. In traditional A-D converters, the above aim is achieved by generating a plurality of reference voltages, the values whereof are normally determined by very precise resistive or capacitive ratios. On the other hand, the fabrication of resistive and capacitive components of controlled value ("matching") involves the use of sophisticated and costly processing steps to minimize the inevitable process-induced dispersions. In addition, all the resistive or capacitive components used for generating the reference voltages should respond in a homogeneous way to external stresses, for example thermal stresses.

To overcome the problems outlined above, A-D converters of sigma-delta type are in some cases preferred to traditional A-D converters. In fact, sigma-delta A-D converters have a very simple circuit structure and normally require a single reference voltage to be generated: their fabrication thus involves less complex and less costly processing steps and, in addition, sigma-delta converters are less sensitive to process-induced variations.

The use of these converters involves, however, a number of problems. It is, in fact, known that a sigma-delta converter receives an analog signal and outputs a sequence of bits that represent the sign of the variations of the analog signal at each operating cycle of the converter. To reconstruct a sample representing the value of the analog signal at a given instant, it is first of all necessary to oversample the analog signal, feeding the sigma-delta converter with a timing signal having a higher frequency than the control frequency. Then, through a decimator, it is necessary to filter the bit sequence supplied by the sigma-delta converter and to select filtered samples, eliminating excess samples, so as to obtain a decimated signal having a decimation frequency equal to the required control frequency.

Normally, however, the decimation frequency is only approximately equal to the control frequency in that it is impossible to guarantee that the frequency of the timing signal will be exactly equal to an integer multiple of the sampling frequency. Consequently, it may occur that, in certain control cycles, no sample of the decimated signal will be supplied to the microprocessor, or else that, instead, a more recent sample will overwrite an older sample which has not yet been used by the microprocessor.

Figure 1A:
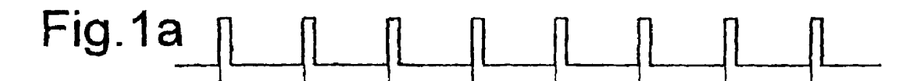
FIGS. 1a–1e show waveforms of quantities present in a control system of a known type.
Figure 1B:
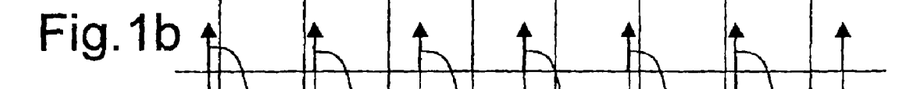
Figures 1C, 1D:
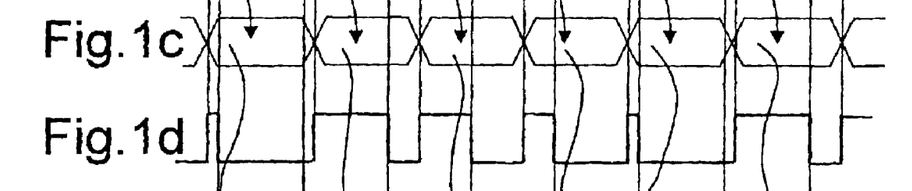
Figure 1E:
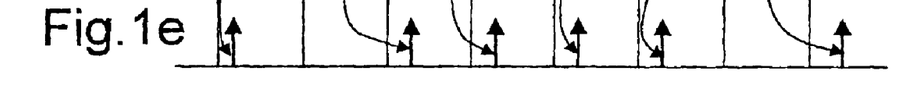

For more clarity, a condition with the decimation frequency lower than the control frequency is illustrated in FIGS. 1a–1e, which show: the plot of a timing signal synchronous with the control signal and activating control cycles (FIG. 1a); a sequence of decimation pulses (FIG. 1b); switchings of the decimated signal (FIG. 1c); the latency of the samples of the decimated signal, i.e., the time intervals between each decimation and when the selected sample is made available to the microprocessor (FIG. 1d); and the instants at which a new value of the control signal is supplied (FIG. 1e).

As may be noted, in some control cycles no sample is taken (i.e., no decimation pulses are present); consequently, in the immediately following control cycles, the microprocessor is not able to supply new values of the control signal, and wait cycles with no control action occur.

On the other hand, it is known that the recurrent presence of wait cycles, in which control actions cannot be performed, significantly degrades the performance of the control system. In addition, the latency of the samples is variable and unpredictable, while it should always be minimized and kept constant. Indeed, this latency affects considerably the phase delay of the control signal and thus may jeopardize the stability of the control system.

Alternatively, it is possible to carry out a frequency conversion before the data generated are read by the microprocessor. In this case, the sequence of samples supplied by the sigma-delta converter is initially filtered with a reconstructing filter to generate a sequence of reconstructed samples, and is then expanded, inserting between two successive samples a first preset integer L of zero samples corresponding to instants comprised in a same sampling interval. The expanded sequence of data is then filtered through a low-pass filter so as to replace the zero samples with interpolated samples. Next, a decimation of the expanded sequence of data is performed, keeping one sample every M samples (M being a second preset integer) and eliminating all the others. By choosing the numbers L and M in such a way that the following condition is satisfied:

$$F_C = L + 1/M \, F_S$$

where $F_C$ is the control frequency and $F_S$ is the frequency of the sequence of reconstructed samples, the decimated sequence of data has a frequency equal to the control frequency $F_C$ and may thus be used to generate the control signal.

However, also the frequency conversion causes an increase in the phase margin, and hence adversely affects the stability of the control system. Furthermore, frequency conversion is performed using microprograms (firmware), and this entails both problems of bulk in so far as it is necessary to provide nonvolatile memories, and an increase in the required processing power.

From the above, it is evident that the use of sigma-delta converters that are not properly synchronized involves even serious difficulties. In particular, the stability of the control systems may be impaired.

BRIEF SUMMARY OF THE INVENTION

According to embodiments of the present invention, a device and a method for generating synchronous numeric signals are provided, with minimization of phase delay.

BRIEF DESCRIPTION OF THE SEVERAL VIEWS OF THE DRAWINGS

For a better understanding of the present invention, preferred embodiments thereof are now described, purely by way of non-limiting example, with reference to the attached drawings, in which.

DETAILED DESCRIPTION OF THE INVENTION

In the described embodiments, the device is used in a read/write (R/W) device for hard disks. This must not, however, be considered in any way limiting, since the invention can be used also in different fields.

Figure 2:
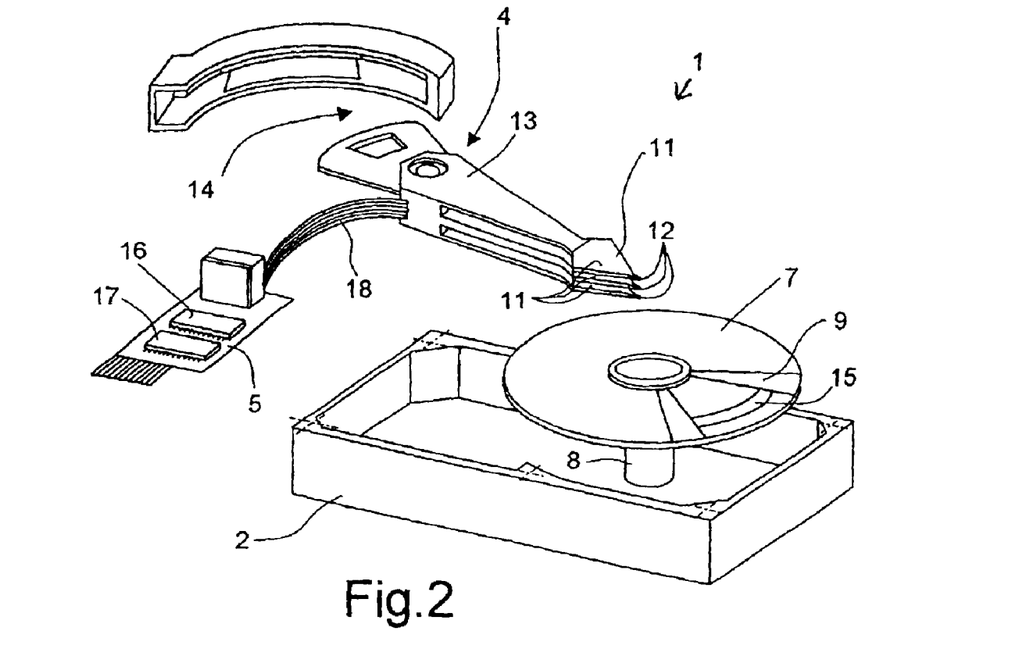
FIG. 2 is a simplified perspective view of a read/write system for a hard disk.

With reference to FIG. 2, number 1 designates, as a whole, an R/W device for hard disks, housed inside a casing 2 and comprising a plurality of magnetic disks 7, a head-actuator assembly 7, and a control board 5.

The magnetic disks 7 are mounted coaxially and angularly fixed on the spindle 18 of a motor (not shown). In addition, control information is stored, in a per se known manner, in predetermined control sectors 9 of the magnetic disks 7.

The head-actuator assembly 4 comprises a rotating support 13 (generally known by the name "E-block" on account of its shape), a plurality of suspension arms 11, which are rigidly connected to the rotating support 13, and a plurality of R/W heads 12, each of which is carried by a respective suspension arm 11, and, during use, faces a respective surface of the magnetic disks 7, for reading and writing. A motor 14 is connected to the rotating support 13 and drives it for positioning the R/W heads 12 on a desired data track 15.

The control board 5 is carried by the casing 2 and comprises a control unit 16 and a sensing unit 17. In addition, the control board 5 is connected to the motor 14 by means of a connector 18 of a known type.

Figure 3:
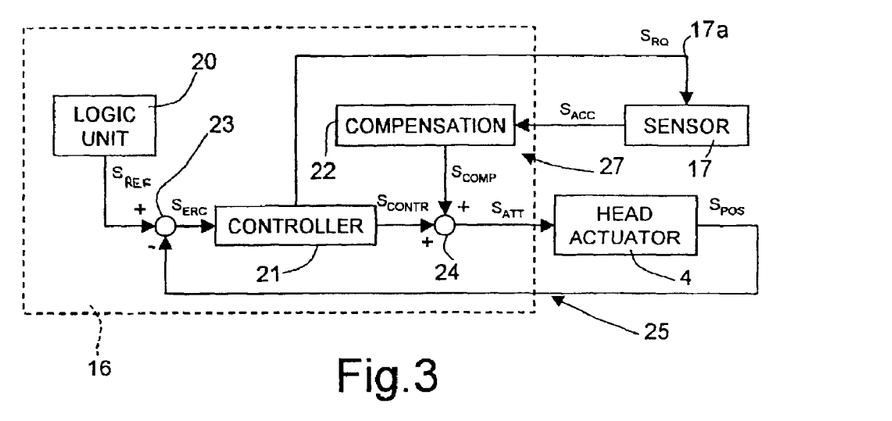
FIG. 3 is a simplified block diagram of a disturbance-compensation device.

As shown in FIG. 3, the control unit 16 comprises a logic unit 20, a controller 21, a compensation block 22, a subtractor node 23, and an adder node 24.

The logic unit 20 generates, in a known way, a reference signal $S_{REF}$ which indicates a target position for the reading heads 12. The subtractor node 23 receives the reference signal $S_{REF}$ and a position signal $S_{POS}$ supplied on an output of the head-actuator assembly 4, again in a known way. The output of the subtractor node 23 is connected to an input of the controller 21. The latter moreover has a first output, connected to the adder node 24 and supplying a control signal $S_{CONTR}$, and a second output 21a, connected to an input 17a of the sensor 17 and supplying sample-request pulses $S_{RQ}$. In addition, an input of the head-actuator assembly 4 is connected to the adder node 24.

The sensing unit 17, which will be described in detail hereinafter with reference to FIG. 4 and is preferably made of a single integrated device, has an output connected to an input of the compensation block 22. In addition, when a sample-request pulse $S_{RQ}$ is supplied, the sensing unit 17 supplies, on its output, an acceleration signal $S_{ACC}$, representing an acceleration A due to disturbance forces, such as mechanical vibrations, that act on the R/W device 1. The compensation block 22, in turn, has an output connected to the adder node 24 and supplying a compensation signal $S_{COMP}$.

In this way, the sensing unit 17 and the compensation block 22 form an open-loop compensation line 27. In addition, the controller 21, the head-actuator assembly 4, and the subtractor node 23 and adder node 24 form a control loop 25.

The position signal $S_{POS}$ supplied by the head-actuator assembly 4 represents the distance of the read heads from a track-centre position and is generated when the read heads 12 pass over the control sectors 9 of the magnetic disks 7. In particular, the position signal $S_{POS}$ is obtained, in a known way, by sampling an analog signal at a control frequency (or, in an equivalent way, with a control period $T_{CONTR}$), which is determined by the speed of rotation of the disks 7 and by the number of control sectors 9. For example, in a disk having an angular velocity of 5400 rpm and 60 control sectors, the control frequency is equal to 5400 Hz. The error signal $S_{ERR}$ and control signal $S_{CONTR}$ generated within the control loop 25 are synchronous with the position signal $S_{POS}$. In addition, also the sample-request pulses $S_{RQ}$ are generated at the control frequency (namely, one for each control period $T_{CONTR}$).

The subtractor node 23 subtracts the position signal $S_{POS}$ from the reference signal $S_{REF}$ and generates an error signal $S_{ERR}$. The error signal $S_{ERR}$ is then used in the controller 21 to obtain the control signal $S_{CONTR}$, employing any known control technique (for example, a PID technique).

The adder node 24 receives the control signal $S_{CONTR}$ and the compensation signal $S_{COMP}$ (which are synchronized) and, by adding them, generates an actuation signal $S_{ATT}$, which is supplied to the head-actuator assembly 4 for correcting the position of the read heads 12.

Figure 4:
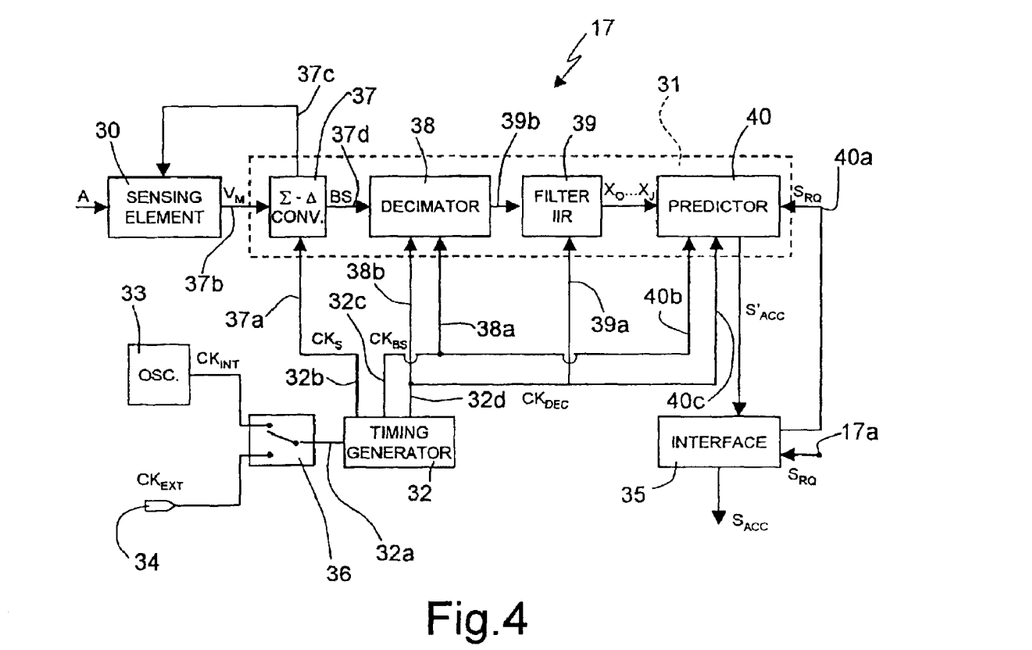
FIG. 4 is a more detailed block diagram of a part of the diagram of FIG. 3, in which a sync device according to the present invention is present.

With reference to FIG. 4, the sensing unit 17 comprises a sensing element 30, an acquisition stage 31, a timing circuit 32, an oscillator 33, and an interface circuit 35.

The sensing element 30, preferably formed by a rotational-type acceleration sensor obtained using MEMS (MicroElectro-Mechanical System) technology, detects the rotational component of the acceleration A to which the R/W device 1 is subjected, for example on account of mechanical vibrations, and has an output that supplies an analog measurement signal $V_M$, which is correlated to the acceleration A.

The acquisition stage 31 is connected between the sensing element 30 and the interface 35 and comprises an analogto-digital converter 37, preferably of the sigma-delta type, a decimator 38, a numeric filter 39, and a predictor 40, which are cascaded together. In addition, the analog-to-digital converter 37 has a control output 37c connected to a control input of the sensing element 30. In this way, the sensing element 30 and the analog-to-digital converter 37 form a sigma-delta acquisition loop, of a type per se known and described, for instance, in "A Three Axis Micromachined Accelerometer with a CMOS Position-Sense Interface and Digital Offset-Trim Electronics", by M. Lemkin and B. Boser, IEEE Journal of Solid State Circuits, Vol. 34, No. 4. The interface 35 has an input that forms the input 17a of the sensor 17 and receives, from the controller 21, the sample-request pulses $S_{RQ}$, which are sent on to a data-request input 40a of the predictor 40.

The timing circuit 32 has an input 32a selectively connectable, via a selector 36 controlled in a per se known manner, to a clock pin 34, on which an external source clock signal $CK_{EXT}$ is supplied, and to an output of the oscillator 33, which supplies an internal source clock signal $CK_{INT}$. In addition, the timing circuit 32 has a first output 32b, connected to a clock input 37a of the analog-to-digital converter 37 and supplying a drive clock signal $CK_S$, having a driving frequency and a driving period; a second output 32c, connected to clock inputs 38a, 40b of the decimator 38 and of the predictor 40, respectively, and supplying a conversion clock signal $CK_{BS}$, having a conversion frequency higher than the control frequency, and a conversion period $T_{BS}$; and a third output 32d, connected to a decimation input 38b of the decimator 38 and to clock inputs 39a, 40c of the numeric filter 39 and of the predictor 40, respectively, and supplying a decimation clock signal $CK_{DEC}$, having a decimation frequency and a decimation period $T_{DEC}$.

The drive clock signal $CK_S$, conversion signal $CK_{BS}$ and decimation signal $CK_{DEC}$ are generated by the timing circuit 32 in a per se known manner by frequency division of the selected source clock signal $CK_{INT}$, $CK_{EXT}$. Consequently, the decimation signal $T_{DEC}$ is equal to an integer multiple N of the conversion period $T_{BS}$. Preferably, the integer multiple N is a power of 2 and is greater than 8 (for example, $N=2^5=32$). In addition, the conversion frequency of the conversion clock signal $CK_{BS}$ and the decimation frequency of the decimation clock signal $CK_{DEC}$ are independent of the control frequency of the control signal $S_{CONTR}$, given that they are generated by different and typically asynchronous sources.

The analog-to-digital converter 37 receives, on a signal input 37b, the analog measurement signal $V_M$ and, using the drive clock signal $T_S$ as internal clock signal, supplies on an output 37d a sampled signal BS, formed by a bitstream produced at the conversion frequency (i.e., one bit at each conversion period $T_{BS}$). In particular, given that the analog-to-digital converter 37 is of the sigma-delta type, the individual bits of the sampled signal BS are correlated to the sign of the variations of the analog measurement signal $V_M$ and are affected by a quantization-noise component, which, as is known to a person skilled in the art, in a sigma-delta converter is translated at a high frequency ("noise shaping").

In a per se known manner, the decimator 38 filters the sampled signal BS received from the analog-to-digital converter 37 in order to reconstruct an oversampled numeric signal, in which each sample is formed by a predetermined number of bits, and in order to eliminate high-frequency spectrum components introduced by sampling the analog measurement signal $V_M$. If these components were not eliminated, in fact, the decimation would produce a folding of the high-frequency components of the spectrum, the said folding, as is known, worsening the signal-to-noise ratio. In addition, at the edges of the decimation clock signal $CK_{DEC}$, the decimator 38 selects a sample for supplying it to a data input 39b of the numeric filter 39 (in practice, one sample is selected every N samples, whereas the other N−1 samples are eliminated).

The numeric filter 39, preferably a second-order self-regressive filter —or infinite impulse-response (IIR) filter—of a known type, filters the data received from the decimator 38 to eliminate the residual high-frequency noise components and to perform phase equalization in the band of interest (for example ranging from 0 to 800 Hz). This enables to compensate and minimize the phase delay introduced by the decimator 38.

According to an embodiment of the invention, the predictor 40 receives, from the numeric filter 39, a detected signal formed by a sequence of detected samples $X_0$, $X_1, \ldots, X_{J-1}, X_J$ generated with the decimation frequency (equal to $1/T_{DEC}$); stores a predetermined number of said samples; and, using a prediction function and the last detected samples $X_0, X_1, \ldots, X_{J-1}, X_J$ stored, at each conversion period $T_{BS}$ calculates an estimation of the acceleration signal $S_{ACC}$, as will be explained in greater detail hereinafter; next, at each control period $T_{CONTR}$, it selects an estimated sample $S'_{ACC}$. In particular, the predictor 40 uses a current detected sample $X_J$ and at least one of the former detected sample $X_0, X_1, \ldots, X_{J-1}$.

When the controller 21 generates a sample-request pulse $S_{RQ}$, the most recent among the estimated samples $S'_{ACC}$ calculated by the predictor 40 is supplied to the interface 35 and is then made available to the compensation block 22 as a new sample of the acceleration signal $S_{ACC}$.

Figure 5:
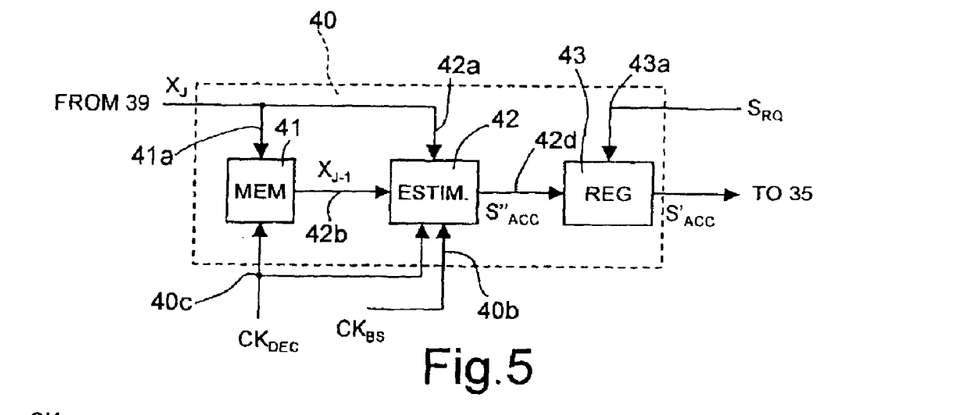
FIG. 5 is a detailed block diagram of one part of the diagram of FIG. 4.

With reference to FIG. 5, the predictor 40 comprises a storage element 41, an estimator block 42, and a register 43. In this case, the estimator block 42 approximates, by means of a step function, the straight line interpolating the former detected sample $X_{J-1}$ and $X_J$, namely the two most recent detected samples, supplied to the predictor 40 in successive detection instants J−1 and J, respectively. In addition, the storage element 41 contains only one detected sample, which is updated at each decimation period $T_{DEC}$, for example at switchings of the decimation clock signal $CK_{DEC}$.

In greater detail, the storage element 41 and the estimator block 42 have respective current-data inputs 41a, 42a connected to the output of the numeric filter 39, so as to receive, at each decimation period $T_{DEC}$, the detected sample $X_J$. In addition, the storage element 41 has a clock input connected to the clock input 40c of the predictor 40, for receiving the decimation clock signal $CK_{DEC}$. The estimator block 42 has a former-data input 42b connected to an output of the storage element 41, supplying the former detected sample $X_{J-1}$, generated and stored at the detection instant J−1; clock inputs connected to the clock inputs 40b, 40c of the predictor 40 for receiving the conversion clock signal $CK_{BS}$ and the decimation clock signal $CK_{DEC}$, respectively; and an output 42d connected to a data input of the register 43 and supplying the estimated samples $S''_{ACC}$ to be selected.

A read input 43a and an output 43b of the register 43 are connected to the interface 35 respectively for receiving the data-request pulses $S'_{RQ}$ and for supplying the estimated samples $S''_{ACC}$ to be selected. In practice, the register 43 has the function of a selector element for selecting an estimated sample $S'_{ACC}$ when it receives a sample-request pulse $S_{RQ}$.

Figure 6A:
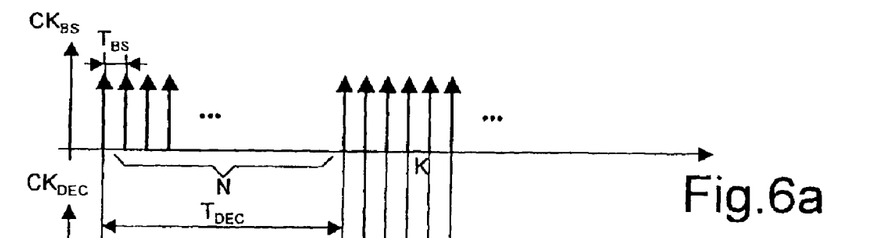
FIGS. 6a–6e show waveforms of a first set of quantities present in the device of FIGS. 3–5.
Figure 6B:
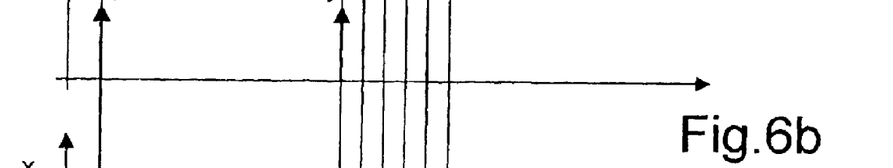
Figure 6C:
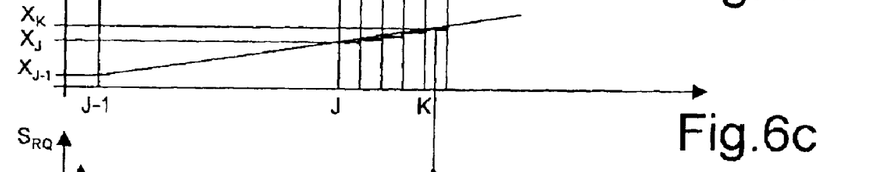
Figure 6D:
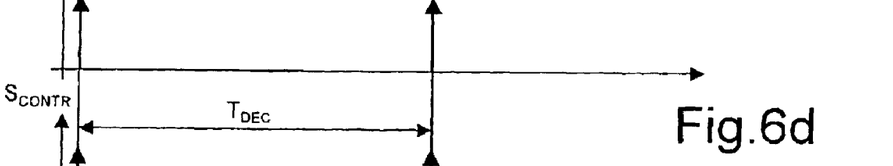
Figure 6E:
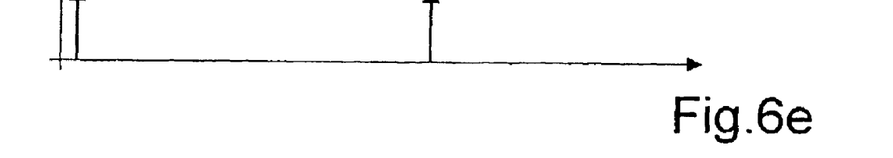

The estimator block 42 calculates the estimated samples $S''_{ACC}$ to be selected, according to the linear prediction function $$S'_{ACC} = X_J + \frac{X_J - X_{J-1}}{T_{DEC}}(KT_{BS} - JT_{DEC}) \quad (1)$$

where K is a counter that indicates the conversion instants following upon the last detection instant J (see, in this connection, FIGS. 6a–6c). In particular, the counter K is reset at each decimation period $T_{DEC}$ and is increased by one unit at each conversion period $T_{BS}$, until the value N−1 is reached. Given that, as mentioned previously, the decimation period $T_{DEC}$ and the conversion period $T_{BS}$ are linked by the relation $T_{BS}=T_{DEC}/N$, the linear prediction function (1) may be written as follows:

$$S'_{ACC} = X_J + \frac{X_J - X_{J-1}}{T_{DEC}}\left(K\frac{T_{DEC}}{N} - JT_{DEC}\right) = X_J + (X_J - X_{J-1})\left(\frac{K}{N} - J\right) \quad (2)$$

Figure 7:
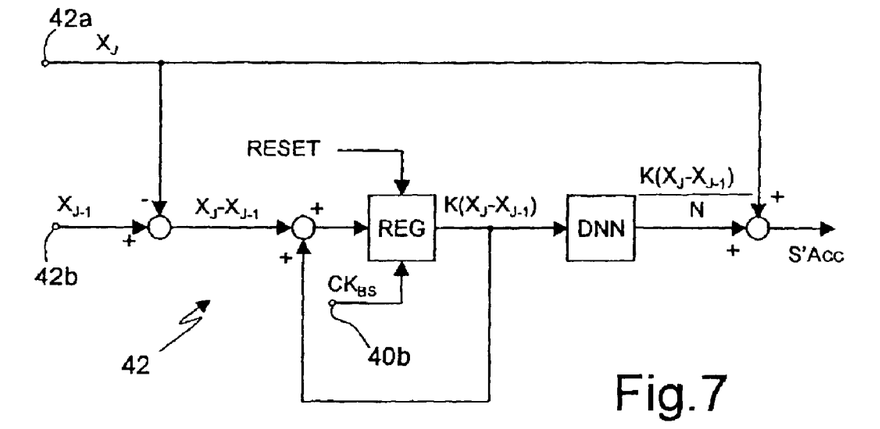
FIG. 7 is a detailed block diagram of one part of the diagram of FIG. 4.
Figure 8A:
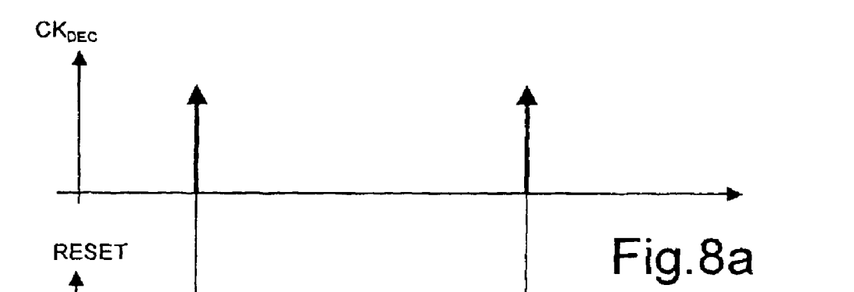
FIGS. 8a–8d show waveforms of a third set of quantities present in the device of FIGS. 3–5 and 7.
Figures 8B, 8C:
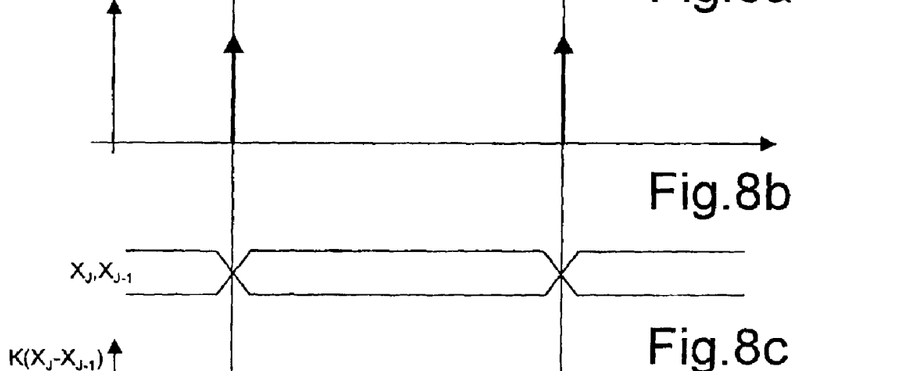
Figure 8D:
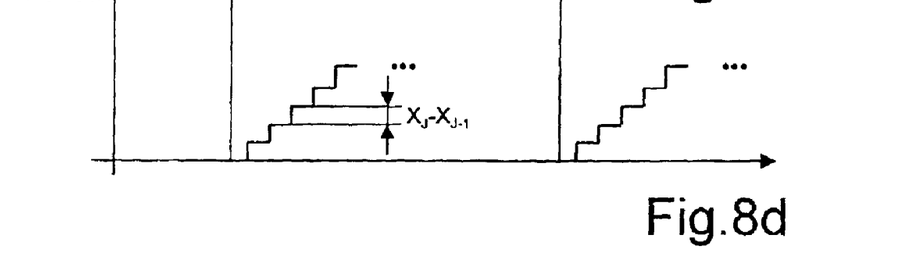
Figure 9A:
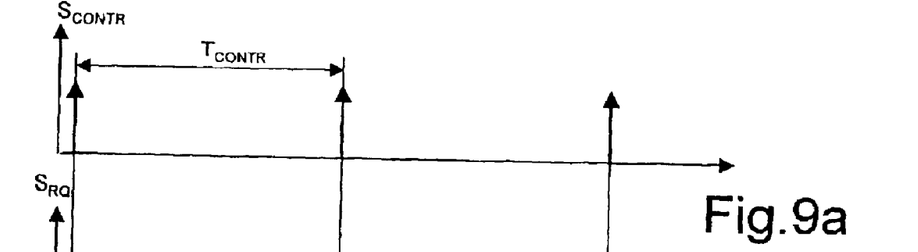
FIGS. 9a–9e show waveforms of a second set of quantities present in the device of FIGS. 3–5 and 7.
Figures 9B, 9C, 9D, 9E:
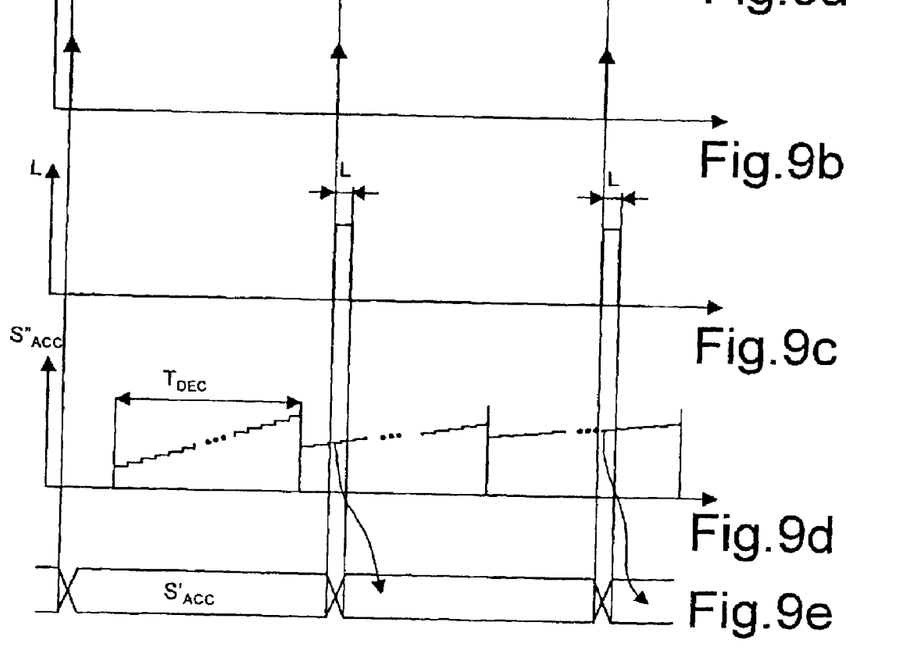

Preferably, the estimator block 42 implements the linear prediction function (2) directly at the hardware level, in a way that is clear to a person skilled in the art, for example (FIG. 7) by using adder, subtractor, and divider blocks, as well as a register which can be reset through a reset signal synchronous with the decimation clock signal $CK_{DEC}$ and which is timed with the conversion clock signal $CK_{BS}$ (FIGS. 8a–8d).

At each detection instant J (i.e., at each cycle of the decimation clock signal $CK_{DEC}$), the estimator block 42 receives the last detected sample $X_J$ from the storage element 41 and the former detected sample $X_{J-1}$, generated at the detection instant J−1 by the numeric filter 39. Then, at each conversion instant K following the detection instant J, the estimator block 42 calculates one of the estimated samples $S''_{ACC}$ to be selected, using the linear prediction function (2), and supplies it to its output 42d.

When the register 43 receives on its read input 43a a sample-request pulse $S_{RQ}$, the estimated sample $S''_{ACC}$ to be selected present at the input of the register 43 (namely, the most recent sample) is stored until the subsequent sample-request pulse $S_{RQ}$ arrives (i.e., for a time interval equal to $T_{CONTR}$) and is supplied to the interface 35 and then to the compensation block 22. The register 43 is thus used as a selector controlled by the controller 21 through the sample-request pulses $S_{RQ}$. In addition, the acceleration signal $S_{ACC}$ is formed by the sequence of the estimated samples $S'_{ACC}$ selected, which coincide with the estimated samples $S''_{ACC}$ to be selected that are on the input of the register 43 in the instants in which the sample-request pulses $S_{RQ}$ are generated.

In practice, using the information contained in the last samples detected $X_J$, $X_{J-1}$, the sensor 17 estimates the value of the acceleration signal $S_{ACC}$ and updates the estimation at each conversion instant K following the detection instant J. Consequently, the value of the acceleration signal $S_{ACC}$ supplied each time to the compensation block 22 when a data-request pulse $S_{RQ}$ is generated represents the last updated estimation available, namely the estimation of the value that the acceleration signal $S_{ACC}$ should assume if a sample were detected at the conversion instant K. In addition, this estimation is also accurate and reliable, since two successive samples detected $X_{J-1}$, $X_J$ are strongly correlated to one another as they derive from a marked oversampling of the quantity to be measured, namely the acceleration A. In fact, the decimation frequency at which the samples detected $X_0, X_1, \ldots, X_J$ are produced (typically from 5 kHz to 20 kHz and more) is considerably higher than the maximum frequency of the spectrum of the acceleration A (approximately 800 kHz, so that the minimum sampling frequency required is approximately 1.6 kHz).

Consequently, even though the control signal $S_{CONTR}$ is not synchronous with the decimation clock signal $CK_{DEC}$, which determines the frequency at which the samples detected $X_0, X_1, \ldots, X_J$ are generated, the acceleration signal $S_{ACC}$ is anyway rendered synchronous with the position signal $S_{POS}$ and the control signal $S_{CONTR}$ (FIGS. 9a–9e). In fact, at each control period $T_{CONTR}$ the controller 21 generates exactly one sample-request pulse $S_{RQ}$.

In addition, the latency L of the estimated samples $S'_{ACC}$ is minimized, since the most recent estimated sample is made available immediately on each sample-request pulse $S_{RQ}$.

Figure 10:
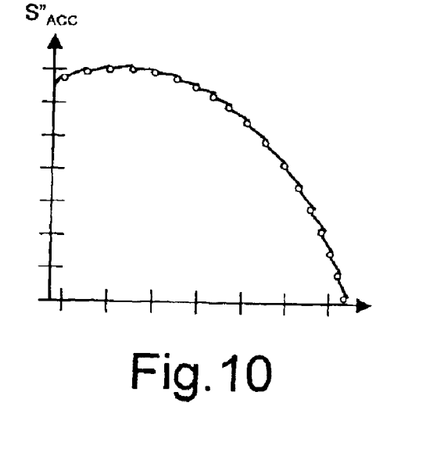
FIG. 10 shows the plot as a function of time of one of the quantities of FIGS. 6a–6e and 9a–9e in a different time interval.

FIG. 10 shows, by way of example, the plot of the estimated samples $S''_{ACC}$ to be selected, which are generated using the linear prediction function, in the case where the acceleration A is sinusoidal. For reasons of simplicity, the estimated samples $S''_{ACC}$ to be selected that are generated in one and the same decimation period $T_{DEC}$ are represented with segments of a straight line.

It is clear from the above description that the control system described above has the following advantages.

First, the precision of the compensation line 27 and the stability of the control loop 25 are improved, as the phase delay of the acceleration signal $S_{ACC}$ is substantially reduced. This is due to the fact that the estimated samples $S''_{ACC}$ to be selected are generated at a high frequency, preferably equal to the frequency of the sampled signal BS supplied by the analog-to-digital converter 37. In this way, at each sample-request pulse $S_{RQ}$, the estimated sample $S'_{ACC}$ selected which is supplied to the interface 35 is generated in the last conversion period $T_{BS}$ (equal to $T_{DEC}/N$). In practice, it is found that, due to the correlation existing between the samples $X_J$, the error committed by approximating the acceleration signal $S_{ACC}$ with a prediction function is less significant than the error that is made using samples which are actually detected (i.e., not approximated), but which are made available with a considerable delay compared to the duration of the control period $T_{CONTR}$. In addition, the device guarantees that in each control cycle exactly one sample of the acceleration signal $S_{ACC}$ will be generated, thus preventing in certain cycles the open-loop compensation from failing or samples from being overwritten.

A further advantage is that both the timing circuit 32 and the predictor 40 are simple to build and require a small area.

Finally it is clear that modifications and variations can be made to the device described herein, without thereby departing from the scope of the present invention.

Figure 11A:
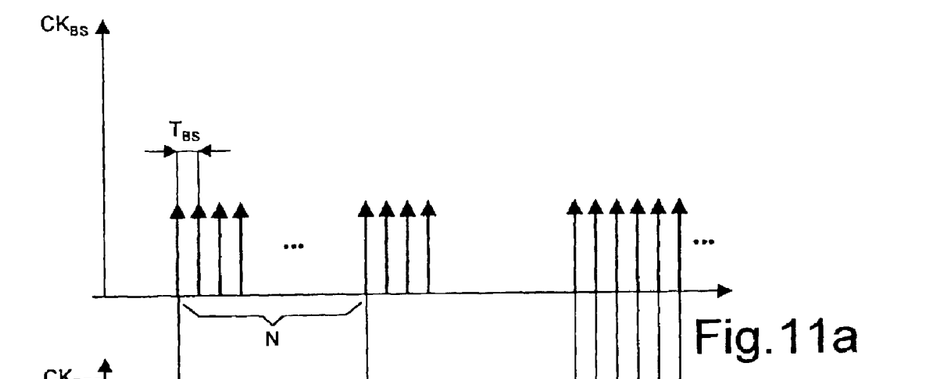
FIGS. 11a–11c show waveforms of quantities present in a variant of the invention.
Figure 11B:
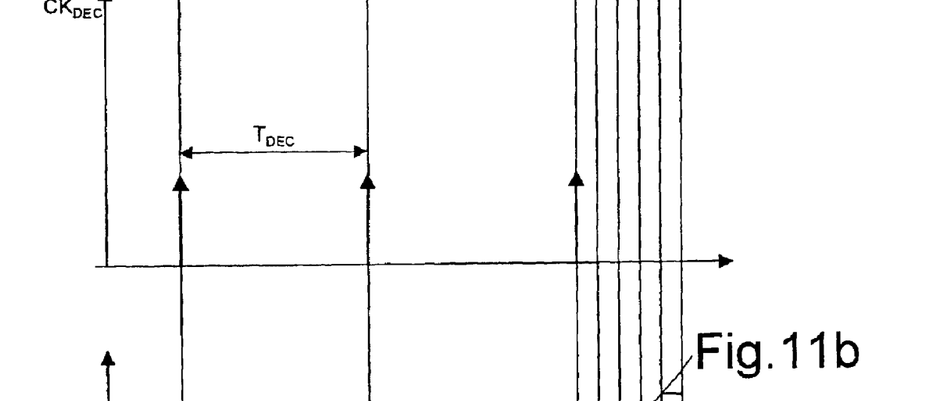
Figure 11C:
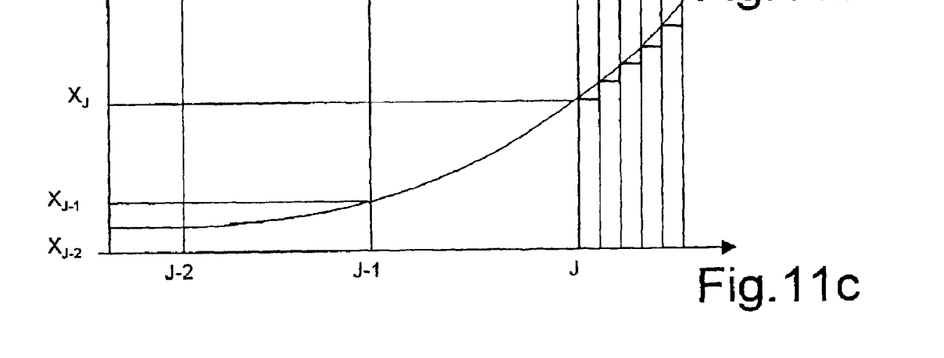

In particular, the predictor 40 can use a prediction function other than the one described previously. For example, a quadratic prediction function can be used which approximates the parabola that interpolates the last three samples detected $X_J$, $X_{J-1}$, $X_{J-2}$, which are respectively generated at the detection instants J, J−1, and J−2 (see FIGS. 11a–11c). In this case, the estimated samples $S''_{ACC}$ to be selected are found using the equation $$S''_{ACC} = A(KT_{BS})^2 + B(KT_{BS}) + C \quad (3)$$

where A, B and C are three coefficients given by the equations $$\begin{cases} A = \left(\frac{1}{2}X_J - X_{J-1} + \frac{1}{2}X_{J-2}\right)\frac{1}{T_{DEC}^2} \\ B = \left(\frac{3}{2}X_J - 2X_{J-1} + \frac{1}{2}X_{J-2}\right)\frac{1}{T_{DEC}} \\ C = X_J \end{cases} \quad (4)$$

Also in this case, the quadratic prediction function can be implemented directly at the hardware level in a way that is clear to a person skilled in the art.

In addition, the storage element 41 contains two detected samples and is of the FIFO (first in first out) type, for example a shift register. At each decimation period $T_{DEC}$, the last sample detected $X_J$ is stored, and the detected sample $X_{J-2}$ is eliminated.

Figure 12:
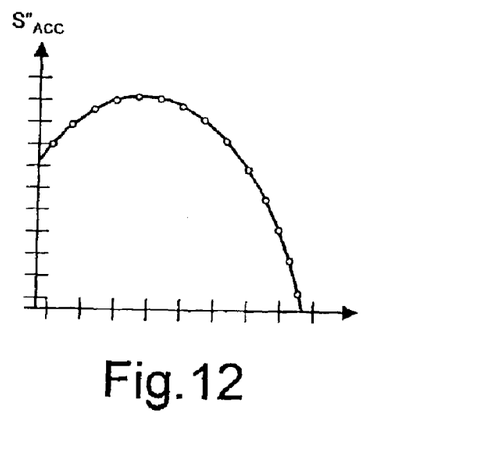
FIG. 12 shows the plot as a function of time of one of the quantities of FIGS. 11a–11c in a different time interval.

FIG. 12 shows, by way of example, the plot of the approximated samples $S''_{ACC}$ to be selected which are generated using the quadratic prediction function, in the case where the acceleration A is sinusoidal. For reasons of simplicity, the estimated samples $S''_{ACC}$ to be selected that are generated in one and the same decimation period $T_{DEC}$ are represented with arcs of a parabola.

In order to reduce the power absorbed by the device, it is possible to activate the estimator block 42 only in the proximity of a sample request. For this purpose it is possible to exploit the enabling signal that is commonly used for enabling, in a known way, the interface 35 when a new sample is required. The said enabling signal can be supplied also to the estimator block 42, so as to activate the latter only when the interface 35 is enabled.

In addition, the invention can be applied in all the cases where it is necessary to generate a numeric signal which is synchronized, both in terms of frequency and in terms of phase, with a numeric reference signal.

All of the above foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A device for generating synchronous numeric signals, comprising:

first signal-generating means which supply numeric reference signal having a first frequency and a first period and including a plurality of reference periods;

second signal-generating means which generate an internal numeric signal ($X_0, X_1, \ldots, X_J$) having a second frequency and a second period ($T_{DEC}$), and a synchronized numeric signal; wherein said second signal-generating means comprise predicting means which generate, with a third period ($T_{BS}$) and a third frequency higher than said first frequency and said second frequency, estimated samples ($S'_{ACC}, S''_{ACC}$) correlated to a current sample ($X_J$) and to a predetermined number of former samples ($X_{J-1}, X_{J-2}$) of said internal numeric signal ($X_0, X_1, \ldots, X_J$); said predicting means comprising selection means controlled by said first signal-generating means for selecting one among said estimated samples ($S'_{ACC}$) in each reference period, said synchronized numeric signal being formed by said selected estimated samples ($S'_{ACC}$).

2. The device according to claim 1, wherein said selection means comprise first storage means, which store in each of said reference periods a respective one of said selected estimated samples ($S'_{ACC}$) for a respective time interval having a duration substantially equal to said reference period, and which have a control terminal that is connected to an output of said first signal-generating means and supplies a selection signal having said first frequency.

3. The device according to claim 1 wherein said second signal-generating means comprise second storage means which store said predetermined number of former samples ($X_{J-1}, X_{J-2}$).

4. The device according to claim 1 wherein said second signal-generating means comprise estimating means which generate said estimate samples ($S''_{ACC}$) according to the equation $$S''_{ACC} = X_J + \frac{X_J - X_{J-1}}{T_{DEC}}(KT_{BS})$$

where J and K are time indices for said internal numeric signal ($X_0, X_1, \ldots, X_J$) and for said estimated samples ($S''_{ACC}$), respectively.

5. The device according to claim 1, characterized in that said second signal-generating means comprise estimating means which generate said estimated samples ($S''_{ACC}$) according to the equation $$S''_{ACC} = A(KT_{BS})^2 + B(KT_{BS}) + C$$

where J and K are time indices for said internal numeric signal ($X_0, X_1, \ldots, X_J$) and for said estimated samples ($S''_{ACC}$), respectively, and A, B and C are coefficients respectively given by the equations $$\begin{cases} A = \left(\frac{1}{2}X_J - X_{J-1} + \frac{1}{2}X_{J-2}\right)\frac{1}{T_{DEC}^2} \\ B = \left(\frac{3}{2}X_J - 2X_{J-1} + \frac{1}{2}X_{J-2}\right)\frac{1}{T_{DEC}} \\ C = X_J \end{cases}$$

6. The device according to claim 1 wherein said second signal-generating means comprise a sensing element, for detecting an analog quantity, and analog-to-digital conversion means.

7. The device according to claim 6, wherein said analog-to-digital conversion means comprise a sigma-delta converter.

8. The device according to claim 7, wherein said second signal-generating means further comprise decimating means and numeric filtering means, which are cascade-connected to said analog-to-digital conversion means.

9. The device according to claim 8, wherein said second signal-generating means comprise a timing circuit having an in input, which receives a source clock signal; a first output connected to said analog-to-digital conversion means and supplying a drive clock signal having a driving frequency; a second output connected to said predicting means and supplying a conversion clock signal having a third frequency and said third period ($T_{BS}$); and a third output connected to said decimating means and to said numeric filtering means and supplying a decimation clock signal having said second frequency and said second period ($T_{DEC}$).

10. The device according to claim 1 wherein said decimation period ($T_{DEC}$) is equal to an integer multiple (N) of said conversion period ($T_{BS}$).

11. The device according to claim 1 wherein aid first signal-generating means comprise controlled means and controller means, which are connected together in such a way as to form a feedback loop, which moreover comprises an adder node; the device further comprising open-loop compensation means having an input connected to said second signal-generating means for receiving said synchronized numeric signal, and an output connected to said adder node and supplying a compensation signal correlated to said synchronized numeric signal.

12. A method for synchronizing numeric signals, comprising the steps of:
generating a numeric reference signal having a first frequency and a first period and including a plurality of reference periods; and
generating an internal numeric signal $(X_0, X_1, \ldots, X_J)$ having a second frequency and a second period $(T_{DEC})$;
predicting estimated samples $(S'_{ACC}, S''_{ACC})$, with a third period $(T_{BS})$ and a third frequency higher than said first frequency and said second frequency, by using a current sample $(X_J)$ and a predetermined number of former samples $(X_{J-1}, X_{J-2})$ of said internal numeric signal $(X_0, X_1, \ldots, X_J)$; and
selecting one among said estimated samples $(S'_{ACC})$ in each of said reference periods.

13. The method according to claim 12, wherein said step of selecting comprises:
generating a selection signal having said first frequency; and
storing one of said estimated samples $(S'_{ACC})$ in each one of said reference periods, at switchings of said selection signal.

14. The method according a claim 12, wherein said step of predicting estimated samples $(S'_{ACC}, S''_{ACC})$ comprises storing said predetermined number of former samples $(X_{J-1}, X_{J-2})$ of said internal numeric signal $(X_0, X_1, \ldots, X_J)$.

15. The method according to claim 12, wherein said step of predicting estimated samples $(S'_{ACC}, S''_{ACC})$ comprises generating said estimated samples $(S'_{ACC})$ using the equation $$S''_{ACC} = X_J + \frac{X_J - X_{J-1}}{T_{DEC}}(KT_{BS})$$

where J and K are time indices for said internal numeric signal $(X_0, X_1, \ldots, X_J)$ and for said estimated samples $(S''_{ACC})$, respectively.

16. The method according to claim 12, wherein said step of predicting estimated samples $(S'_{ACC}, S''_{ACC})$ comprises generating said estimated samples $(S''_{ACC})$ using the equation $$S''_{ACC} = A(KT_{BS})^2 + B(KT_{BS}) + C$$

where J and K are time indices for said internal numeric signal $(X_0, X_1, \ldots, X_J)$ and for said estimated samples $(S''_{ACC})$, respectively, and A, B and C are coefficients respectively given by the equations $$\begin{cases} A = \left(\frac{1}{2}X_J - X_{J-1} + \frac{1}{2}X_{J-2}\right)\frac{1}{T_{DEC}^2} \\ B = \left(\frac{3}{2}X_J - 2X_{J-1} + \frac{1}{2}X_{J-2}\right)\frac{1}{T_{DEC}} \\ C = X_J \end{cases}$$

17. The method according to claim 12, wherein said step of generating said internal numeric signal $(X_0, X_1, \ldots, X_J)$ comprises:

detecting an analog quantity; and
converting said analog quantity into a numeric quantity.

18. The method according to claim 17, wherein said step of converting comprises using sigma-delta analog-to-digital converter means.

19. The method according to claim 17 wherein said step of generating said internal numeric signal $(X_0, X_1, \ldots, X_J)$ further comprises decimating at said second frequency and numerically filtering said numeric quantity.

20. The method according to claim 12, wherein said second period $(T_{DEC})$ is equal to an integer multiple (N) of said conversion period $(T_{BS})$.

21. A device for generating synchronous numeric signals, comprising:
a first signal generator that supplies a numeric reference signal having a first frequency and including a plurality of reference periods;
a second signal generator that generates internal numeric signal having a second frequency;
a predictor coupled to the first and second signal generators, the predictor being structured to generate, with a third frequency higher than the first frequency and the second frequency, estimated samples correlated to a current sample and a predetermined number of former samples of the internal numeric signal; the predictor including a selector that selects one among the estimated samples in each reference period under control of the first signal generator, the selected estimated samples together forming a synchronized numeric signal.

22. A device for controlling the reading of a computer storage medium by a read unit, comprising:
a control unit that supplies a numeric reference signal having a first frequency and including a plurality of reference periods;
a sensor unit having an input coupled to output of the control unit and an output coupled to the input of the control unit, the sensor unit being structured to generate a synchronized numeric signal that is used by the control unit to adjust a position of the read unit with respect to the computer storage medium, the sensor unit including:
a signal generator that generates an internal numeric signal corresponding to an acceleration imparted to the read unit, the internal numeric signal having a second frequency, and
a predictor coupled to the control unit and signal generator, the predictor being structured to generate, with a third frequency higher than the first frequency and the second frequency, estimated samples correlated to a current sample and a predetermined number of former samples of the internal numeric signal; the predictor including a selector that selects one among the estimated samples in each reference period under control of the control unit, the selected estimated samples together forming the synchronized numeric signal.

* * * * *